(12) United States Patent  (10) Patent No.: US 9,411,656 B2
Jindal et al.  (45) Date of Patent: Aug. 9, 2016

(54) LOAD BALANCE CONNECTIONS PER SERVER IN MULTI-CORE/MULTI-BLADE SYSTEM

(75) Inventors: Avinash Jindal, Milpitas, CA (US); Deepak Bansal, San Jose, CA (US); Sam Htin Moy, Daly City, CA (US); David Cheung, Cupertino, CA (US); Bing Wang, San Jose, CA (US); Mani Kancherla, Milpitas, CA (US); Sridhar Devarapalli, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1751 days.

(21) Appl. No.: 12/489,366

(22) Filed: Jun. 22, 2009

(65) Prior Publication Data

US 2010/0325280 A1  Dec. 23, 2010

(51) Int. Cl.
  *G06F 15/173*  (2006.01)
  *G06F 9/50*  (2006.01)
(52) U.S. Cl.
  CPC .................................. *G06F 9/5083* (2013.01)
(58) Field of Classification Search
  None
  See application file for complete search history.

(56) References Cited

U.S. PATENT DOCUMENTS

| 5,867,706 | A | 2/1999 | Martin et al. |
| 6,351,743 | B1 * | 2/2002 | DeArdo et al. ............... 707/718 |
| 6,996,615 | B1 | 2/2006 | McGuire |
| 7,086,061 | B1 * | 8/2006 | Joshi et al. .................... 718/105 |
| 7,290,059 | B2 | 10/2007 | Yadav |
| 2002/0091697 | A1 * | 7/2002 | Huang et al. ................... 707/10 |
| 2002/0133532 | A1 * | 9/2002 | Hossain ........................ 709/105 |
| 2004/0024861 | A1 * | 2/2004 | Coughlin ...................... 709/224 |
| 2004/0210887 | A1 * | 10/2004 | Bergen et al. ................. 717/168 |
| 2008/0016206 | A1 * | 1/2008 | Ma et al. ....................... 709/224 |

* cited by examiner

*Primary Examiner* — Thomas Dailey
(74) *Attorney, Agent, or Firm* — Bever, Hoffman & Harms, LLP

(57) ABSTRACT

A network device includes a plurality of blades, each having a plurality of CPU cores that process requests received by the network device. Each blade further includes an accumulator circuit. Each accumulator circuit periodically aggregates the local counter values of the CPU cores of the corresponding blade. One accumulator circuit is designated as a master, and the other accumulator circuit(s) are designated as slave(s). The slave accumulator circuits transmit their aggregated local counter values to the master accumulator circuit. The master accumulator circuit aggregates the sets of aggregated local counter values to create a set of global counter values. The master accumulator circuit transmits the global counter values to a management processor (for display), to the CPU cores located on its corresponding blade, and to each of the slave accumulator circuits. Each slave accumulator circuit then transmits the global counter values to the CPU cores located on its corresponding blade.

18 Claims, 12 Drawing Sheets

| Time Interval | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Master Read | $LC_{00}$ | $LC_{01}$ | $LC_{02}$ | $LC_{03}$ | $LC_{04}$ | $LC_{05}$ | $LC_{06}$ | $LC_{07}$ | - | - | - | - | $LC_{00}$ | $LC_{01}$ | $LC_{02}$ | $LC_{03}$ |
| Master Write | - | - | - | - | - | - | - | - | - | - | - | - | - | - | - | - |
| Slave1 Read | - | $LC_{10}$ | $LC_{11}$ | $LC_{12}$ | $LC_{13}$ | $LC_{14}$ | $LC_{15}$ | $LC_{16}$ | $LC_{17}$ | - | - | - | - | $LC_{10}$ | $LC_{11}$ | $LC_{12}$ |
| Slave1 Write | - | - | - | - | - | - | - | - | - | TOM | - | - | - | - | - | - |
| Slave2 Read | $LC_{20}$ | - | $LC_{21}$ | $LC_{22}$ | $LC_{23}$ | $LC_{24}$ | $LC_{25}$ | $LC_{26}$ | $LC_{27}$ | - | - | - | $LC_{20}$ | - | $LC_{21}$ | $LC_{22}$ |
| Slave2 Write | - | - | - | - | - | - | - | - | - | - | TOM | - | - | - | - | - |
| Slave3 Read | $LC_{30}$ | $LC_{31}$ | - | $LC_{32}$ | $LC_{33}$ | $LC_{34}$ | $LC_{35}$ | $LC_{36}$ | $LC_{37}$ | - | - | - | $LC_{30}$ | $LC_{31}$ | - | $LC_{32}$ |
| Slave3 Write | - | - | - | - | - | - | - | - | - | - | - | TOM | - | - | - | - |
| Master HF ACC | - | - | - | - | - | - | - | - | - | - | - | - | ACC | ACC | ACC | ACC |
| Master LF ACC | - | - | - | - | - | - | - | - | - | - | - | - | - | - | - | - |

FIG. 4A

| Time Interval | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| Master Read | $LC_{00}$ | $LC_{01}$ | $LC_{02}$ | $LC_{03}$ | $LC_{04}$ | $LC_{05}$ | $LC_{06}$ | $LC_{07}$ | - | - | - | - | $LC_{04}$ | $LC_{05}$ | $LC_{06}$ | $LC_{07}$ |
| Master Write | $TO\ S1$ | $TO\ S2$ | $TO\ S3$ | $TO\ MP$ | $GC_{00}$ | $GC_{01}$ | $GC_{02}$ | $GC_{03}$ | $GC_{04}$ | $GC_{05}$ | $GC_{06}$ | $GC_{07}$ | - | - | - | - |
| Slave1 Read | - | $LC_{10}$ | $LC_{11}$ | $LC_{12}$ | $LC_{13}$ | $LC_{14}$ | $LC_{15}$ | $LC_{16}$ | $LC_{17}$ | - | - | - | $LC_{13}$ | $LC_{14}$ | $LC_{15}$ | $LC_{16}$ |
| Slave1 Write | - | - | $GC_{15}$ | $GC_{16}$ | $GC_{17}$ | $GC_{10}$ | $GC_{11}$ | $GC_{12}$ | $GC_{13}$ | $TO\ M$ | - | - | - | - | - | - |
| Slave2 Read | $LC_{20}$ | - | $LC_{21}$ | $LC_{22}$ | $LC_{23}$ | $LC_{24}$ | $LC_{25}$ | $LC_{26}$ | $LC_{27}$ | - | - | - | $LC_{23}$ | $LC_{24}$ | $LC_{25}$ | $LC_{26}$ |
| Slave2 Write | - | - | - | $GC_{24}$ | $GC_{26}$ | $GC_{27}$ | $GC_{20}$ | $GC_{21}$ | $GC_{22}$ | $GC_{23}$ | $TO\ M$ | - | - | - | - | - |
| Slave3 Read | $LC_{30}$ | $LC_{31}$ | - | $LC_{32}$ | $LC_{33}$ | $LC_{34}$ | $LC_{35}$ | $LC_{36}$ | $LC_{37}$ | - | - | - | $LC_{33}$ | $LC_{34}$ | $LC_{35}$ | $LC_{36}$ |
| Slave3 Write | - | - | - | $GC_{34}$ | $GC_{35}$ | $GC_{36}$ | $GC_{37}$ | $GC_{30}$ | $GC_{31}$ | $GC_{32}$ | $GC_{33}$ | $TO\ M$ | - | - | - | - |
| Master HF ACC | - | - | - | - | - | - | - | - | - | - | - | - | ACC | ACC | ACC | ACC |
| Master LF ACC | - | - | - | - | - | - | - | - | - | - | - | - | - | - | - | - |

FIG. 4B

| Time Interval | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| Master Read | $LC_{00}$ | $LC_{01}$ | $LC_{02}$ | $LC_{03}$ | $LC_{04}$ | $LC_{05}$ | $LC_{06}$ | $LC_{07}$ | - | - | - | - | - | - | - | - |
| Master Write | TO S1 | TO S2 | TO S3 | TO MP | $GC_{00}$ | $GC_{01}$ | $GC_{02}$ | $GC_{03}$ | $GC_{04}$ | $GC_{05}$ | $GC_{06}$ | $GC_{07}$ | - | - | - | - |
| Slave1 Read | - | $LC_{10}$ | $LC_{11}$ | $LC_{12}$ | $LC_{13}$ | $LC_{14}$ | $LC_{15}$ | $LC_{16}$ | $LC_{17}$ | - | - | - | $LC_{17}$ | - | - | - |
| Slave1 Write | - | - | - | - | - | - | - | - | - | - | - | - | - | - | - | - |
| Slave1 Write | - | - | - | - | $GC_{17}$ | $GC_{10}$ | $GC_{11}$ | $GC_{12}$ | $GC_{13}$ | TO M | - | - | - | TO M | - | - |
| Slave2 Read | $LC_{20}$ | - | $LC_{21}$ | $LC_{22}$ | $LC_{23}$ | $LC_{24}$ | $LC_{25}$ | $LC_{26}$ | $LC_{27}$ | - | - | - | $LC_{27}$ | - | - | - |
| Slave2 Write | - | $GC_{14}$ | $GC_{15}$ | $GC_{25}$ | $GC_{26}$ | $GC_{27}$ | $GC_{20}$ | $GC_{21}$ | $GC_{22}$ | $GC_{23}$ | TO M | - | - | - | TO M | - |
| Slave3 Read | $LC_{30}$ | $LC_{31}$ | - | $LC_{32}$ | $LC_{33}$ | $LC_{34}$ | $LC_{35}$ | $LC_{36}$ | $LC_{37}$ | - | - | - | $LC_{37}$ | - | - | - |
| Slave3 Write | - | - | - | - | - | $GC_{36}$ | $GC_{37}$ | $GC_{30}$ | $GC_{31}$ | $GC_{32}$ | $GC_{33}$ | TO M | - | - | - | TO M |
| Master HF ACC | - | - | - | - | - | - | - | - | - | - | - | - | ACC | ACC | ACC | ACC |
| Master LF ACC | - | - | - | - | - | - | - | - | - | - | - | - | - | - | - | - |

FIG. 4C

| Time Interval | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| Master Read | $LC_{00}$ | $LC_{01}$ | $LC_{02}$ | $LC_{03}$ | $LC_{04}$ | $LC_{05}$ | $LC_{06}$ | $LC_{07}$ | - | - | - | - | - | - | - | - |
| Master Write | TO S1 | TO S2 | TO S3 | TO MP | $GC_{00}$ | $GC_{01}$ | $GC_{02}$ | $GC_{03}$ | $GC_{04}$ | $GC_{05}$ | $GC_{06}$ | $GC_{07}$ | - | - | - | - |
| Slave1 Read | - | $LC_{10}$ | $LC_{11}$ | $LC_{12}$ | $LC_{13}$ | $LC_{14}$ | $LC_{15}$ | $LC_{16}$ | $LC_{17}$ | TO M | - | - | - | - | - | - |
| Slave1 Write | - | $GC_{14}$ | $LC_{11}$ | $GC_{16}$ | $GC_{17}$ | $GC_{10}$ | $GC_{11}$ | $GC_{12}$ | $GC_{13}$ | - | - | - | - | - | - | - |
| Slave2 Read | $LC_{20}$ | - | $LC_{21}$ | $LC_{22}$ | $LC_{23}$ | $LC_{24}$ | $LC_{25}$ | $LC_{26}$ | $LC_{27}$ | - | TO M | - | - | - | - | - |
| Slave2 Write | - | - | $GC_{24}$ | $GC_{25}$ | $GC_{26}$ | $GC_{27}$ | $GC_{20}$ | $GC_{21}$ | $GC_{22}$ | $GC_{23}$ | - | - | - | - | - | - |
| Slave3 Read | $LC_{30}$ | $LC_{31}$ | - | $LC_{32}$ | $LC_{33}$ | $LC_{34}$ | $LC_{35}$ | $LC_{36}$ | $LC_{37}$ | - | - | TO M | - | - | - | - |
| Slave3 Write | - | - | - | $GC_{34}$ | $GC_{35}$ | $GC_{36}$ | $GC_{37}$ | $GC_{30}$ | $GC_{31}$ | $GC_{32}$ | $GC_{33}$ | - | - | - | - | - |
| Master HF ACC | - | - | - | - | - | - | - | - | - | - | - | - | ACC | ACC | ACC | ACC |
| Master LF ACC | - | - | - | - | - | - | - | - | - | - | - | - | ACC | ACC | ACC | ACC |

FIG. 4D

| Time Interval | 63 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|
| Master Read | $LC_{00}$ | $LC_{01}$ | $LC_{02}$ | $LC_{03}$ | $LC_{04}$ | $LC_{05}$ | $LC_{06}$ | $LC_{07}$ | - | - | - | - | $LC_{00}$ | $LC_{01}$ | $LC_{02}$ | $LC_{03}$ |
| Master Write | TO S1 | TO S2 | TO S3 | TO MP | $GC_{00}$ | $GC_{01}$ | $GC_{02}$ | $GC_{03}$ | $GC_{04}$ | $GC_{05}$ | $GC_{06}$ | $GC_{07}$ | TO S1 | TO S2 | TO S3 | TO MP |
| Slave1 Read | - | $LC_{10}$ | $LC_{11}$ | $LC_{12}$ | $LC_{13}$ | $LC_{14}$ | $LC_{15}$ | $LC_{16}$ | $LC_{17}$ | - | - | - | - | $LC_{10}$ | $LC_{11}$ | $LC_{12}$ |
| Slave1 Write | - | $GC_{14}$ | $GC_{15}$ | $GC_{16}$ | $GC_{17}$ | $GC_{13}$ | $GC_{11}$ | $GC_{12}$ | $GC_{13}$ | - | - | - | - | $GC_{14}$ | $GC_{15}$ | $GC_{16}$ |
| Slave2 Read | $LC_{20}$ | - | $LC_{21}$ | $LC_{22}$ | $LC_{23}$ | $LC_{24}$ | $LC_{25}$ | $LC_{26}$ | $LC_{27}$ | - | - | - | $LC_{20}$ | - | $LC_{21}$ | $LC_{22}$ |
| Slave2 Write | - | - | $GC_{24}$ | $GC_{25}$ | $GC_{26}$ | $GC_{27}$ | $GC_{20}$ | $GC_{21}$ | $GC_{22}$ | - | TO M | - | - | - | $GC_{24}$ | $GC_{25}$ |
| Slave3 Read | $LC_{30}$ | $LC_{31}$ | - | $LC_{32}$ | $LC_{33}$ | $LC_{36}$ | $LC_{35}$ | $LC_{36}$ | $LC_{37}$ | TO M | - | - | $LC_{30}$ | $LC_{31}$ | - | $LC_{32}$ |
| Slave3 Write | - | - | - | $GC_{34}$ | $GC_{35}$ | $GC_{36}$ | $GC_{37}$ | $GC_{30}$ | $GC_{31}$ | $GC_{32}$ | $GC_{33}$ | TO M | - | - | - | $GC_{34}$ |
| Master HF ACC | - | - | - | - | - | - | - | - | - | - | - | - | ACC | ACC | ACC | ACC |
| Master LF ACC | - | - | - | - | - | - | - | - | - | - | - | - | - | - | - | - |

FIG. 5A

| Time Interval | 80 | 81 | 82 | 83 | 84 | 85 | 86 | 87 | 88 | 89 | 90 | 91 | 92 | 93 | 94 | 95 |
|---|---|---|---|---|---|---|---|---|---|---|---|---|---|---|---|---|
| Master Read | LC00 | LC01 | LC02 | LC03 | LC04 | LC05 | LC06 | LC07 | - | - | - | - | LC04 | LC05 | LC06 | LC07 |
| Master Write | TO S1 | TO S2 | TO S3 | TO MP | GC00 | GC01 | GC02 | GC03 | GC04 | GC05 | GC06 | GC07 | GC00 | GC01 | GC02 | GC03 |
| Slave1 Read | - | LC10 | LC11 | LC12 | LC13 | LC14 | LC15 | LC16 | LC17 | - | - | - | LC13 | LC14 | LC15 | LC16 |
| Slave1 Write | - | GC14 | GC15 | GC16 | GC17 | GC10 | GC11 | GC12 | GC13 | - | - | - | GC17 | GC10 | GC11 | GC12 |
| Slave2 Read | LC20 | - | LC21 | LC22 | LC23 | LC24 | LC25 | LC26 | LC27 | TO M | - | - | LC23 | LC24 | LC25 | LC26 |
| Slave2 Write | - | - | GC24 | GC25 | GC26 | GC27 | GC20 | GC21 | GC22 | GC23 | - | - | GC26 | GC27 | GC20 | GC21 |
| Slave3 Read | LC30 | LC31 | - | - | LC33 | LC34 | LC35 | LC36 | LC37 | - | TO M | - | LC33 | LC34 | LC35 | LC36 |
| Slave3 Write | - | - | - | GC34 | GC35 | GC36 | GC37 | GC30 | GC31 | GC32 | GC33 | TO M | GC35 | GC36 | GC37 | GC30 |
| Master HF ACC | - | - | - | - | - | - | - | - | - | - | - | - | ACC | ACC | ACC | ACC |
| Master LF ACC | - | - | - | - | - | - | - | - | - | - | - | - | - | - | - | - |

FIG. 5B

| Time Interval | 96 | 97 | 98 | 99 | 100 | 101 | 102 | 103 | 104 | 105 | 106 | 107 | 108 | 109 | 110 | 111 |
|---|---|---|---|---|---|---|---|---|---|---|---|---|---|---|---|---|
| Master Read | $LC_{00}$ | $LC_{01}$ | $LC_{02}$ | $LC_{03}$ | $LC_{04}$ | $LC_{05}$ | $LC_{06}$ | $LC_{07}$ | - | - | - | - | - | - | - | - |
| Master Write | TO S1 | TO S2 | TO S3 | TO MP | $GC_{00}$ | $GC_{01}$ | $GC_{02}$ | $GC_{03}$ | $GC_{04}$ | $GC_{05}$ | $GC_{06}$ | $GC_{07}$ | $GC_{04}$ | $GC_{05}$ | $GC_{06}$ | $GC_{07}$ |
| Slave1 Read | - | $LC_{10}$ | $LC_{11}$ | $LC_{12}$ | $LC_{13}$ | $LC_{14}$ | $LC_{15}$ | $LC_{16}$ | $LC_{17}$ | - | - | - | $LC_{17}$ | - | - | - |
| Slave1 Write | - | $GC_{14}$ | $GC_{15}$ | $GC_{16}$ | $GC_{17}$ | $GC_{10}$ | $GC_{11}$ | $GC_{12}$ | $GC_{13}$ | TO M | - | - | $GC_{13}$ | TO M | - | - |
| Slave2 Read | $LC_{20}$ | - | $LC_{21}$ | $LC_{22}$ | $LC_{23}$ | $LC_{24}$ | $LC_{25}$ | $LC_{26}$ | $LC_{27}$ | - | - | - | $LC_{27}$ | - | - | - |
| Slave2 Write | - | - | $GC_{24}$ | $GC_{25}$ | $GC_{26}$ | $GC_{27}$ | $GC_{20}$ | $GC_{21}$ | $GC_{22}$ | $GC_{23}$ | TO M | - | $GC_{22}$ | $GC_{23}$ | TO M | - |
| Slave3 Read | $LC_{30}$ | $LC_{31}$ | - | $LC_{32}$ | $LC_{33}$ | $LC_{34}$ | $LC_{35}$ | $LC_{36}$ | $LC_{37}$ | - | - | - | $LC_{37}$ | - | - | - |
| Slave3 Write | - | - | - | $GC_{34}$ | $GC_{35}$ | $GC_{36}$ | $GC_{37}$ | $GC_{30}$ | $GC_{31}$ | $GC_{32}$ | $GC_{33}$ | TO M | $GC_{31}$ | $GC_{32}$ | $GC_{33}$ | TO M |
| Master HF ACC | - | - | - | - | - | - | - | - | - | - | - | - | ACC | ACC | ACC | ACC |
| Master LF ACC | - | - | - | - | - | - | - | - | - | - | - | - | - | - | - | |

FIG. 5C

| Time Interval | 112 | 113 | 114 | 115 | 116 | 117 | 118 | 119 | 120 | 121 | 122 | 123 | 124 | 125 | 126 | 127 |
|---|---|---|---|---|---|---|---|---|---|---|---|---|---|---|---|---|
| Master Read | $LC_{00}$ | $LC_{01}$ | $LC_{02}$ | $LC_{03}$ | $LC_{04}$ | $LC_{05}$ | $LC_{06}$ | $LC_{07}$ | - | - | - | - | - | - | - | - |
| Master Write | TO S1 | TO S2 | TO S3 | TO MP | $GC_{00}$ | $GC_{01}$ | $GC_{02}$ | $GC_{03}$ | $GC_{04}$ | $GC_{05}$ | $GC_{06}$ | $GC_{07}$ | - | - | - | - |
| Slave1 Read | - | $LC_{10}$ | $LC_{11}$ | $LC_{12}$ | $LC_{13}$ | $LC_{14}$ | $LC_{15}$ | $LC_{16}$ | $LC_{17}$ | - | - | - | - | - | - | - |
| Slave1 Write | - | $GC_{14}$ | $GC_{15}$ | $GC_{16}$ | $GC_{17}$ | $GC_{10}$ | $GC_{11}$ | $GC_{12}$ | $GC_{13}$ | TO M | - | - | - | - | - | - |
| Slave2 Read | $LC_{20}$ | - | $LC_{21}$ | $LC_{22}$ | $LC_{23}$ | $LC_{24}$ | $LC_{25}$ | $LC_{26}$ | $LC_{27}$ | - | - | - | - | - | - | - |
| Slave2 Write | - | - | $GC_{24}$ | $GC_{25}$ | $GC_{26}$ | $GC_{27}$ | $GC_{20}$ | $GC_{21}$ | $GC_{22}$ | $GC_{23}$ | TO M | - | - | - | - | - |
| Slave3 Read | $LC_{30}$ | $LC_{31}$ | - | $LC_{32}$ | $LC_{33}$ | $LC_{34}$ | $LC_{35}$ | $LC_{36}$ | $LC_{37}$ | - | - | - | - | - | - | - |
| Slave3 Write | - | - | - | $GC_{34}$ | $GC_{35}$ | $GC_{36}$ | $GC_{37}$ | $GC_{30}$ | $GC_{31}$ | $GC_{32}$ | $GC_{33}$ | TO M | - | - | - | - |
| Master HF ACC | - | - | - | - | - | - | - | - | - | - | - | - | ACC | ACC | ACC | ACC |
| Master LF ACC | - | - | - | - | - | - | - | - | - | - | - | - | ACC | ACC | ACC | ACC |

FIG. 5D

LOAD BALANCE CONNECTIONS PER SERVER IN MULTI-CORE/MULTI-BLADE SYSTEM

FIELD OF THE INVENTION

The present invention relates to a method and structure for implementing server load balancing in a multi-core/multi-blade system.

RELATED ART

FIG. 1 is a block diagram of a load balancing system 100, which includes a load balancer 101 coupled to a plurality of real servers $120_1$-$120_N$ and the Internet 150. An administrator establishes network services (such as a web server), and maps this service to a virtual service, which is defined on load balancer 101. Users submit inquiries (requests) to virtual service on load balancer 101 via the Internet 150, to reach real services on real servers $120_1$-$120_N$.

Load balancer 101 includes a master processor 110 and a plurality of processor (CPU) cores 111-118, which operate to transmit the requests received by the load balancer 101 to real servers $120_1$-$120_N$ for processing. Load balancer 101 implements server load balancing, wherein the requests received by the load balancer 101 are distributed among the various real servers $120_1$-$120_N$ using a selected distribution metric. The distribution of traffic across multiple real servers $120_1$-$120_N$ may be performed using one of many conventional load balancing metrics (predictors), including, for example, least connections, round robin, weighted, or server response time.

Each of CPU cores 111-118 includes a corresponding set of local counters, which maintain statistics associated with the traffic (requests) processed through the corresponding CPU core. Each of the CPU cores 111-118 periodically sends its local counter values to a central core processor 110, which is dedicated to the management of load balancer 101. The local counter values are typically transmitted to central core processor 110 via IPC messages or IP packets. Upon receiving the local counter values from the CPU cores 111-118, central core processor 110 saves the local counter values for each individual CPU core in a corresponding memory area dedicated for that CPU core. When a report needs to be generated, central core processor 110 aggregates the saved local counter values, and reports the result. Some of the local counter values are relied on by the predictors used to perform the load balancing. These local counter values are periodically aggregated by central core processor 110, thereby creating a set of global (aggregated) counter values, which are returned to each of CPU cores 111-118 via IPC messages or IP packets.

As the number of CPU cores in load balancer 101 increases, it becomes difficult, if not impossible, to accurately load balance connections across all CPU cores in software. More specifically, the exchange of IPC messages (or IP packets) between CPU cores 111-118 and central core processor 110, and the aggregation of local counter values within central core processor 110 consume a substantial amount of CPU resources. Due to the high usage of CPU resources, IPC messages (or IP packets) cannot be exchanged frequently enough to avoid significant processing delays. These delays adversely impact the accuracy of the global (aggregated) count values relied on by the predictors for load balancing in CPU cores 111-118. In addition, because central core processor 110 must keep a copy of the local counter values for each of CPU cores 111-118, central core processor 110 requires a large memory, resulting in inefficient memory usage. This problem is significantly amplified as more CPU cores are added to load balancer 101.

Accordingly, it would be desirable to have a load balancer capable of aggregating the local counter values of CPU cores 111-118, and returning the aggregated counter values to CPU cores 111-118, without imposing excessive processing requirements on central core processor 110. It would also be desirable to have a load balancer capable of aggregating the local counter values of CPU cores 111-118 in a time efficient manner. It would further be desirable to have a load balancer that does not require the central core processor 110 to have a memory capacity sufficient to store all of the local counter values from all of the CPU cores 111-118.

SUMMARY

Accordingly, the present invention provides a load balancer that implements a hardware-based method to load balance the connections per server in a multi-core/multi-blade system. The load balancer includes a management card that includes a management processor, and one or more blades, each including a plurality of CPU cores that are responsible for routing the requests received by the load balancer to real servers. Each blade further includes an accumulator logic circuit. Each accumulator logic circuit aggregates the local counter values of the CPU cores located on the corresponding blade. In a load balancer that includes multiple blades, one of the accumulator logic circuits is designated as a master, and the other accumulator logic circuit(s) are designated as slave(s). In this case, the slave accumulator logic circuits transmit their aggregated local counter values to the master accumulator logic circuit. The master accumulator logic circuit aggregates the aggregated local counter values to create a set of global counter values. The master accumulator logic circuit transmits the global counter values to the management processor of the load balancer (e.g., for display). Note that the management processor is not involved in the aggregation of counter values, thereby allowing the management processor to perform other tasks. The management processor is also not required to store all of the local counter values from all of the CPU cores, thereby reducing the storage requirements of the management processor.

The master accumulator logic circuit also transmits the global counter values to the CPU cores located on its corresponding blade. The master accumulator logic circuit also transmits the global counter values to each of the slave accumulator logic circuits. In response, each of the slave accumulator logic circuits transmits the global counter values to the CPU cores located on its corresponding blade.

Aggregating the local counter values in this manner advantageously allows the global counter values to be updated relatively quickly (e.g., in a matter of milliseconds rather than hundreds of milliseconds). As a result, the load balancing performed by the CPU cores in response to the local and global counter values is optimized (i.e., accurate). Moreover, additional blades (i.e., CPU cores) can be added to the load balancer, without significantly affecting the ability to aggregate the local counter values associated with the CPU cores of these additional blades.

The present invention will be more fully understood in view of the following description and drawings.

BRIEF DESCRIPTION OF THE DRAWINGS

FIGS. 4A-4D are timing diagrams of a first sixty-four time interval period of a counter synchronization process in accordance with one embodiment of the present invention.

FIGS. 5A-5D are timing diagrams of a second sixty-four time interval period of a counter synchronization process in accordance with one embodiment of the present invention.

DETAILED DESCRIPTION

Figure 1:
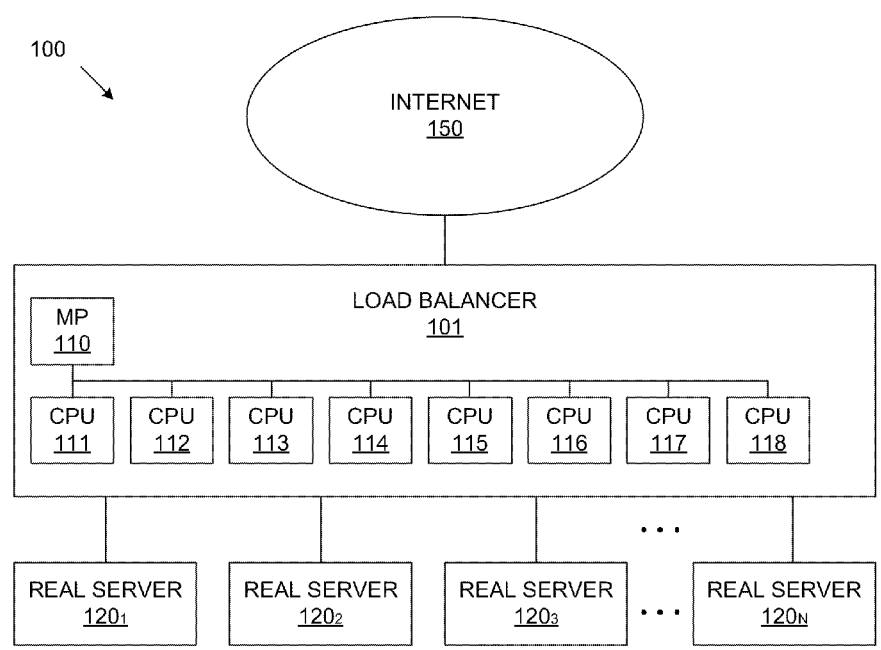
FIG. 1 is a block diagram of a conventional load balancer system.
Figure 2:
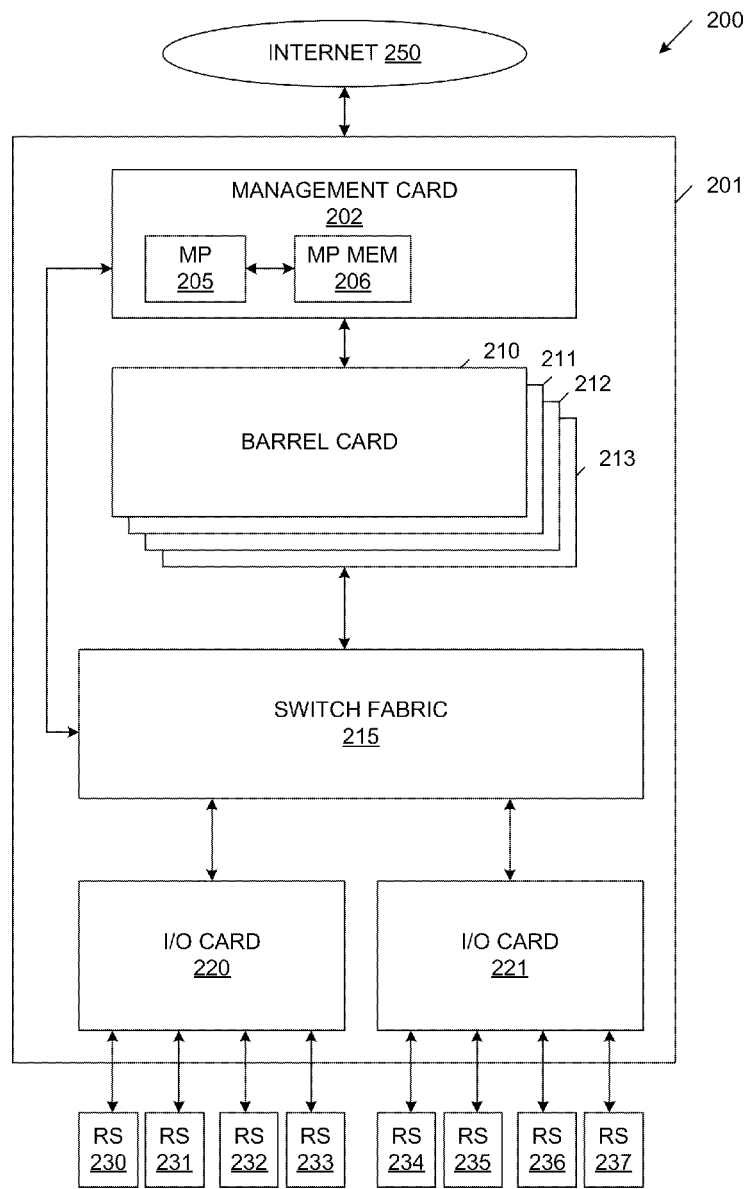
FIG. 2 is a block diagram of a load balancer system in accordance with one embodiment of the present invention.

FIG. 2 is a block diagram of a network system 200 in accordance with one embodiment of the present invention. Network system 200 includes a network device 201, which is coupled to the Internet 250, and real servers 230-237. Network device 201 can be, for example, an application server, load balancer, layer 4-7 (L4-7) switch or layer 2-7 (L2-7) switch. Network device 201 includes a management card 202, barrel cards (blades) 210-213, switch fabric 215 and input/output (I/O) cards 220-221, which are coupled as illustrated. Although four barrel cards are used in the described examples, it is understood that network device 201 may be implemented using other numbers of barrel cards in other embodiments.

Management card 202 includes a management processor 205 and an associated corresponding management processor memory 206. As described in more detail below, management processor 205 is not involved with the aggregating and updating of counters within network device 201. Rather, these processes are performed within barrel cards 210-213. The aggregated counter values of network system 200 are periodically updated and stored in management processor memory 206. Management processor 205 then accesses management processor memory 206 to display a global view of the aggregated counter values of network system 200 via a visual interface (not shown).

Barrel cards 210-213 include a plurality of CPU cores for processing requests received from the internet 250. Switch fabric 215 provides connections between the CPU cores of barrel cards 210-213 and I/O cards 220-221. I/O cards 220-221 include ports that provide connections to real servers 230-237. Although only eight real servers are illustrated in FIG. 2, it is understood that other numbers of real servers may be connected to network device 201. In the described examples, up to 4K real servers may be coupled to network device 201.

Figure 3:
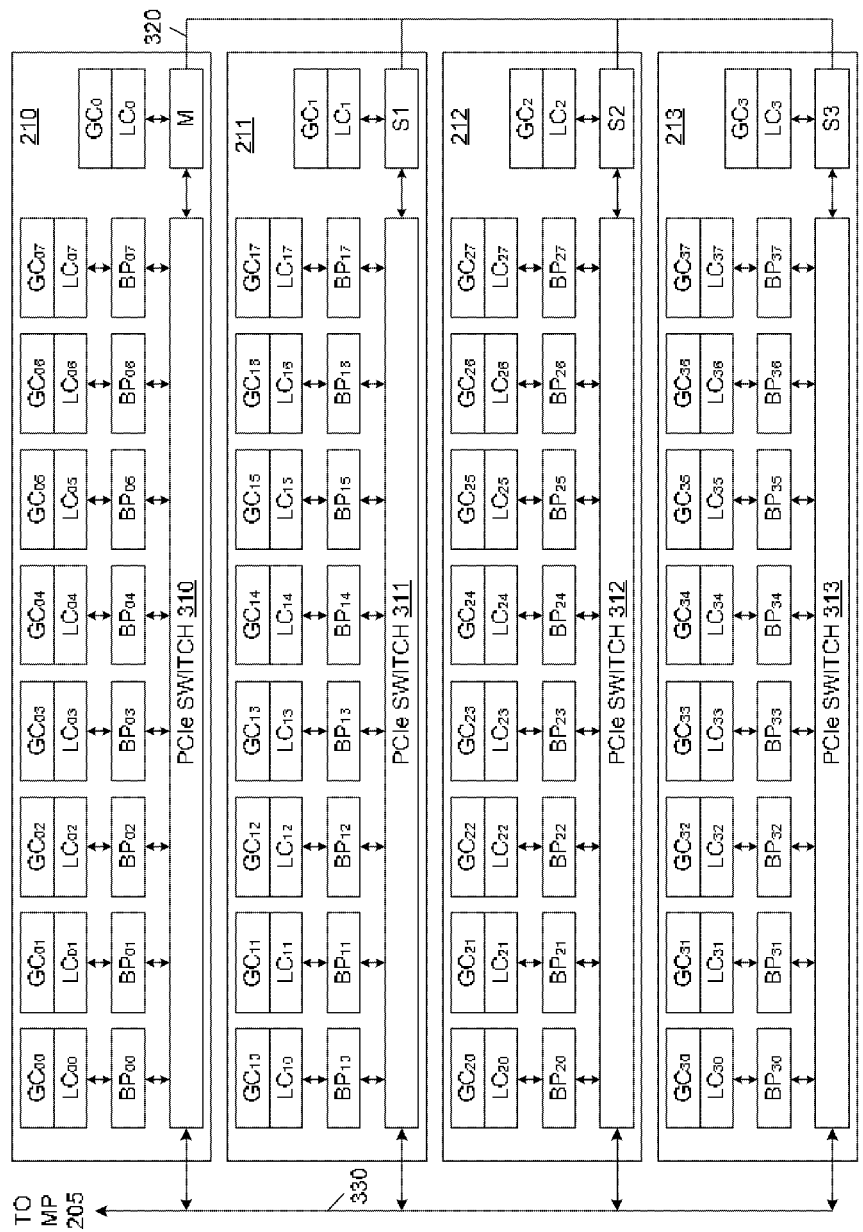
FIG. 3 is a block diagram illustrating barrel cards of the load balancer system of FIG. 2 in accordance with one embodiment of the present invention.

FIG. 3 is a block diagram illustrating barrel cards 210-214 in accordance with one embodiment of the present invention. Barrel cards 210, 211, 212 and 213 include CPU cores (i.e., barrel processors) $BP_{00}$-$BP_{07}$, $BP_{10}$-$BP_{17}$, $BP_{20}$-$BP_{27}$ and $BP_{30}$-$BP_{37}$, respectively, local statistics counter memories $LC_{00}$-$LC_{07}$, $LC_{10}$-$LC_{17}$, $LC_{20}$-$LC_{27}$ and $LC_{30}$-$LC_{37}$, respectively, and global statistics counter memories $GC_{00}$-$GC_{07}$, $GC_{10}$-$GC_{17}$, $GC_{20}$-$GC_{27}$ and $GC_{30}$-$GC_{37}$, respectively. Barrel cards 210, 211, 212 and 213 also include switching circuits 310, 311, 312 and 313, respectively, accumulator logic blocks M, S1, S2 and S3, respectively, local accumulator memories $LC_0$, $LC_1$, $LC_2$ and $LC_3$, respectively, and global accumulator memories $GC_0$, $GC_1$, $GC_2$ and $GC_3$, respectively.

Each of the barrel processors $BP_{XY}$ (X=0-3; Y=0-7) is coupled to a corresponding local counter memory $LC_{XY}$ and a corresponding global counter memory $GC_{XY}$. Each local counter memory $LC_{XY}$ stores a local copy of the counter values that are specific to the corresponding barrel processor $BP_{XY}$. That is, each local counter memory $LC_{XY}$ stores a local copy of the counter values that represent the packets, bytes, connections or any other metric processed by the corresponding barrel processor $BP_{XY}$. Each barrel processor $BP_{XY}$ updates its corresponding local counter memory $LC_{XY}$ in response to the scheduling actions performed by the barrel processor $BP_{XY}$.

Each of the barrel processors $BP_{XY}$ is also coupled to a corresponding global counter memory $GC_{XY}$. Each global counter memory $GC_{XY}$ stores a copy of the aggregated counter values of all of the local counter memories $LC_{XY}$. As described in more detail below, each global counter memory $GC_{XY}$ is periodically updated during normal operation of network system 200.

In the described embodiments, it is assumed that each barrel processor $BP_{XY}$ implements up to 32K statistics counters, based on 4K real servers and 8 counters per real server. It is further assumed that each of these 32K counters has a width of 64-bits (or 8-bytes). Thus, the total required capacity for each local counter memory $LC_{XY}$ is 32K×8 B, or 256 KB. The total required capacity for each global counter memory $GC_{XY}$ is also 256 KB. In other embodiments, network system 200 may implement other numbers/sizes of statistics counters.

Switching circuits 310, 311, 312 and 313 couple barrel processors $BP_{00}$-$BP_{07}$, $BP_{10}$-$BP_{17}$, $BP_{20}$-$BP_{27}$ and $BP_{30}$-$BP_{37}$, respectively, to accumulator logic blocks M, S1, S2 and S3, respectively. In the described embodiments, barrel processors $BP_{00}$-$BP_{07}$, $BP_{10}$-$BP_{17}$, $BP_{20}$-$BP_{27}$ and $BP_{30}$-$BP_{37}$ are coupled to accumulator logic blocks M, S1, S2 and S3 by x8 PCI Express (PCIe) links, such that switching circuits 310-313 are PCIe switching circuits. PCIe switching circuits 310-313 and management card 202 are commonly coupled to x8 PCIe link structure 330.

Accumulator logic blocks M, S1, S2 and S3 are coupled to local accumulator memories $LC_0$, $LC_1$, $LC_2$ and $LC_3$, respectively, and global accumulator memories $GC_0$, $GC_1$, $GC_2$ and $GC_3$, respectively. In the described embodiments, each of the accumulator logic blocks M, S1, S2 and S3 is implemented by an FPGA or ASIC, which is located on the associated barrel card. One of the accumulator logic blocks (e.g., accumulator logic block M) is designated as a master, and the other accumulator logic blocks (e.g., accumulator logic blocks S1, S2 and S3) are designated as slaves. This designation can be made, for example, by programming configuration registers on the accumulator logic blocks.

In general, accumulator logic blocks M, S1, S2 and S3 collect and accumulate the contents of the local counter memories $LC_{00}$-$LC_{07}$, $LC_{10}$-$LC_{17}$, $LC_{20}$-$LC_{27}$ and $LC_{30}$-$LC_{37}$, respectively, and store the results in the local accumulator memories $LC_0$, $LC_1$, $LC_2$ and $LC_3$, respectively. The following pseudo-code generally describes the operations performed by the accumulator logic blocks M, S1, S2 and S3 for each of the statistics counters.

Barrel Card 210 (Accumulator Logic Block M)
$LC_0$_LOCAL_CTR=0;
For(x=0; x<=7; x++)
$LC_0$_LOCAL_CTR=$LC_0$_LOCAL_CTR+
 $LC_{0x}$_LOCAL_CTR;

Barrel Card 211 (Accumulator Logic Block S1)
  LC$_1$_LOCAL_CTR=0;
  For(x=0; x<=7; x++)
  LC$_1$_LOCAL_CTR=LC$_1$_LOCAL_CTR+
    LC$_{1x}$_LOCAL_CTR;
Barrel Card 212 (Accumulator Logic Block S2)
  LC$_2$_LOCAL_CTR=0;
  For(x=0; x<=7; x++)
  LC$_2$_LOCAL_CTR=LC$_2$_LOCAL_CTR+
    LC$_{2x}$_LOCAL_CTR;
Barrel Card 213 (Accumulator Logic Block S3)
  LC$_3$_LOCAL_CTR=0;
  For(x=0; x<=7; x++)
  LC$_3$_LOCAL_CTR=LC$_3$_LOCAL_CTR+
    LC$_{3x}$_LOCAL_CTR;

The slave accumulator logic blocks S1, S2 and S3, then transmit the contents of their respective local accumulator memories LC$_1$, LC$_2$ and LC$_3$ to master accumulator logic block M over PCIe links 330. Master accumulator logic block M then accumulates the contents of local accumulator memories LC$_0$, LC$_1$, LC$_2$ and LC$_3$, and stores the results in global accumulator memory GC$_0$, thereby creating a global count view. The following pseudo-code generally describes the operations performed by the master accumulator logic block M in response to the contents of the local accumulator memories LC$_0$, LC$_1$, LC$_2$ and LC$_3$ during this process.

Barrel Card 210 (Accumulator Logic Block M)
  GC$_0$_GLOBAL_CTR=0;
  For(x=0; x<=3; x++)//4 accumulator blocks only
  GC$_0$_GLOBAL_CTR=GC$_0$_GLOBAL_CTR+LC$_x$_LOCAL_CTR;

Master accumulator logic block M then transfers the contents of the global accumulator memory GC$_0$ to the global counter memories GC$_{00}$-GC$_{07}$ on the same barrel card 210. Master accumulator logic block M also transfers the contents of the global accumulator memory GC$_0$ to the management processor memory 206 on management card 202. Master accumulator logic block M further transmits the contents of the global accumulator memory GC$_0$ to the global accumulator memories GC$_1$, GC$_2$ and GC$_3$ on barrel cards 211, 212 and 213, respectively. The following pseudo-code generally describes the operations performed by the master accumulator logic block M during this process.

Barrel Card 210 (Accumulator Logic Block M)
  For(x=0; x<=7; x++)
  GC$_{0x}$_GLOBAL_CTR=GC$_0$_GLOBAL_CTR;
  Memory_206_GLOBAL_CTR=GC$_0$_GLOBAL_CTR;
  For(x=1; x<=3; x++)
  GC$_x$_GLOBAL_CTR=GC$_0$_GLOBAL_CTR;

Slave accumulator logic blocks S1, S2 and S3 then transfer the contents of the respective global accumulator memories GC$_1$, GC$_2$ and GC$_3$ to the global counter memories, GC$_{10}$-GC$_{17}$, GC$_{20}$-GC$_{27}$ and GC$_{30}$-GC$_{37}$, respectively. The following pseudo-code generally describes the operations performed by the slave accumulator logic blocks S1, S2 and S3 during this process.

Barrel Card 211 (Accumulator Logic Block S1)
  For(x=0; x<=7; x++)
  GC$_{1x}$_GLOBAL_CTR=GC$_1$_GLOBAL_CTR;
Barrel Card 212 (Accumulator Logic block S2)
  For(x=0; x<=7; x++)
  GC$_{2x}$_GLOBAL_CTR=GC$_2$_GLOBAL_CTR;
Barrel Card 213 (Accumulator Logic Block S3)
  For(x=0; x<=7; x++)
  GC$_{3x}$_GLOBAL_CTR=GC$_3$_GLOBAL_CTR;

In accordance with one variation of the above-described embodiment, global accumulator memories GC$_1$, GC$_2$ and GC$_3$ are eliminated, and the global counter memories GC$_{10}$-GC$_{17}$, GC$_{20}$-GC$_{27}$ and GC$_{30}$-GC$_{37}$, are updated directly from the master accumulator logic block M. This variation reduces the memory storage requirements of barrel cards 211-213, but increases the time that PCIe links 330 are busy during the counter synchronization process.

In the foregoing manner, the global counter memories GC$_{00}$-GC$_{07}$, GC$_{10}$-GC$_{17}$, GC$_{20}$-GC$_{27}$ and GC$_{30}$-GC$_{37}$ and the management processor memory 206 are periodically updated to store the most recent global counter values of network system 200. Advantageously, management processor 205 is not required to update the global count values, and is therefore free to perform other functions. Because the management processor memory 206 is only required to store the aggregated global count values (and not the local count values of each of the barrel processors), the required capacity of management processor memory 206 is relatively small, when compared with conventional network systems. Moreover, because the accumulator logic blocks M, S1, S2 and S3 aggregate the local counter values on the corresponding barrel cards 210, 211, 212 and 213, the traffic on PCIe links 330 is significantly reduced with respect to conventional network systems (which require the transmission of local count values between each of the barrel processors and the management processor).

The counter accumulation process in accordance with one embodiment of the present invention will now be described in more detail.

FIGS. 4A, 4B, 4C and 4D illustrate the first sixty-four time intervals 0-63 of a counter synchronization process in accordance with one embodiment of the present invention. FIGS. 5A, 5B, 5C and 5D illustrate the second sixty-four time intervals 64-127 of the same counter synchronization process. In the described examples, each time interval has a duration of 1 micro-second (μs). Other embodiments may implement other time intervals as required to achieve the desired performance. In the described examples, each read/write operation performed by the accumulator logic blocks M, S1, S2 and S3 during a single time interval has a width of 1 KB (e.g., 128 64-bit counter values).

Network system 200 supports both high-frequency (HF) and low-frequency (LF) statistics counters, and supports both 32-bit and 64-bit counters. In general, the HF statistics counters are synchronized every 16 time intervals, and the LF statistics counters are synchronized every 64 time intervals. That is, the HF statistics counters are updated at a faster rate than the LF statistics counters. In the described embodiments, the HF statistics counters store values that are used to implement the server load balancing functionality within network system 200, while the LF statistics counters store other values, which are not used in the server load balancing functionality.

Figure 6:
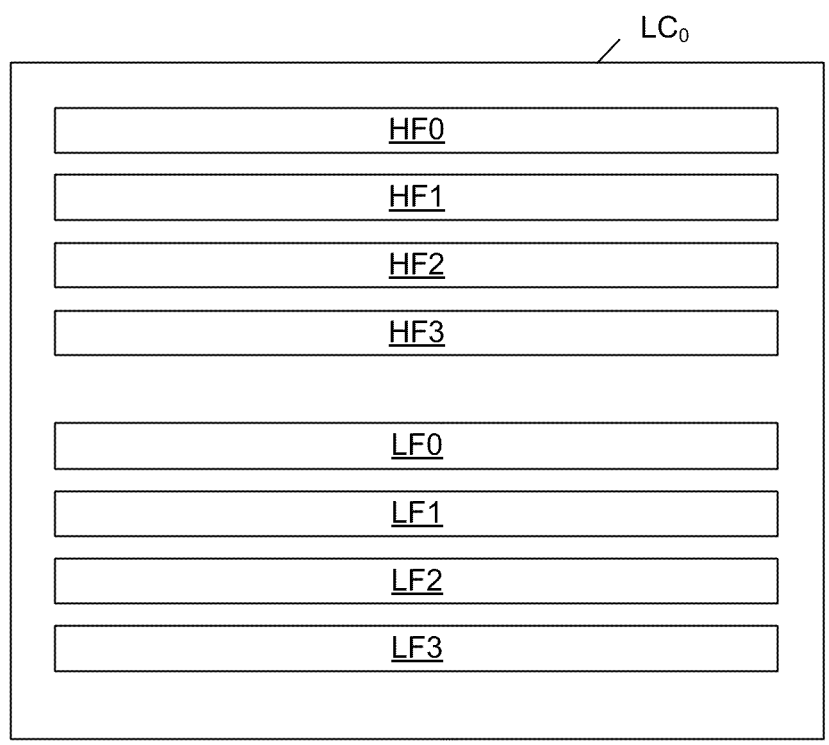
FIG. 6 is a block diagram illustrating eight memory buffers, which are implemented within a local accumulator memory of a barrel card of FIG. 3 in accordance with one embodiment of the present invention.

FIG. 6 is a block diagram illustrating eight 1 KB memory buffers HF0, HF1, HF2, HF3, LF0, LF1, LF2 and LF3, which are implemented within local accumulator memory LC$_0$ in accordance with the present embodiment. In general, memory buffers HF0, HF1, HF2 and HF3 are used to accumulate HF statistics counter values, and memory buffers LF1, LF2, LF3 and LF4 are used to accumulate LF statistics counter values. The operation of these memory buffers is described in more detail below.

At the start of the counter synchronization process, master accumulator logic block M asserts a timing signal, which is provided to slave accumulator logic blocks S1, S2 and S3 on timing line 320. In response, the synchronization process is initiated within accumulator logic blocks M, S1, S2 and S3. Each of the accumulator logic blocks M, S1, S2 and S3 operates in response to a system clock signal, such that the operation of these blocks is synchronized in the manner described below.

During the time intervals 0-7, master accumulator logic block M reads associated sets of HF counter values from local counter memories $LC_{00}$-$LC_{07}$, respectively. Master accumulator logic block M accumulates (adds) these HF counter values, and stores these accumulated HF counter values in memory buffer HF0 within local accumulator memory $LC_0$.

During the time intervals 1-8, slave accumulator logic block S1 reads associated sets of HF counter values from local counter memories $LC_{10}$-$LC_{17}$, respectively. Slave accumulator logic block S1 accumulates these HF counter values (during time intervals 2-8), and stores these accumulated HF counter values in local accumulator memory $LC_1$. During time interval 9, slave accumulator logic block S1 writes these accumulated HF counter values to memory buffer HF1 within local accumulator memory $LC_0$. More specifically, slave accumulator logic block S1 transmits the accumulated HF counter values from local accumulator memory $LC_1$ to PCIe switch 311, PCIe links 330 and PCIe switch 310 to master accumulator logic block M. Master accumulator logic block M then writes the received accumulated HF counter values to memory buffer HF1 within local accumulator memory $LC_0$.

During time intervals 0 and 2-8, slave accumulator logic block S2 reads associated HF counter values from local counter memories $LC_{20}$-$LC_{27}$, respectively. Slave accumulator logic block S2 accumulates these HF counter values (during time intervals 2-8), and stores these accumulated HF counter values in local accumulator memory $LC_2$. During time interval 10, slave accumulator logic block S2 writes these accumulated HF counter values to memory buffer HF2 within local accumulator memory $LC_0$ (via PCIe switch 312, PCIe links 330, PCIe switch 310 and master accumulator logic block M).

During time intervals 0-1 and 3-8, slave accumulator logic block S3 reads associated HF counter values from local counter memories $LC_{30}$-$LC_{37}$, respectively. Slave accumulator logic block S3 accumulates these HF counter values (during time intervals 2 and 3-8), and stores these accumulated HF counter values in local accumulator memory $LC_3$. During time interval 11, slave accumulator logic block S3 writes these accumulated HF counter values to memory buffer HF3 within local accumulator memory $LC_0$ (via PCIe switch 313, PCIe links 330, PCIe switch 310 and master accumulator logic block M).

During time intervals 12-15, master accumulator logic block M accumulates (ACC) the contents of the memory buffers HF0-HF3 of local accumulator memory $LC_0$, thereby generating a first set (1 KB) of HF global count values. During the accumulation process, master accumulator logic block M stores the resulting set of HF global count values in global accumulator memory $GC_0$. Note that the above-described 16 time interval process is repeated (e.g., during time intervals 16-31 of FIG. 4B, time intervals 32-47 of FIG. 4C and time intervals 48-63 of FIG. 4D), such that a new set of HF global count values is calculated and stored in global accumulator memory $GC_0$ by the end of each successive 16 time interval period.

After a set of HF global count values is calculated, these updated HF global count values are written to the global counter memories $GC_{00}$-$GC_{07}$, $GC_{00}$-$GC_{17}$, $GC_{20}$-$GC_{27}$, $GC_{30}$-$GC_{37}$ and the management processor memory 206, in the manner described below in connection with FIG. 4B.

As illustrated in FIG. 4B, master accumulator logic block M writes the updated HF global count values from global accumulator memory $GC_0$ to the global accumulator memory $GC_1$ of slave accumulator logic block S1 during time interval 16. More specifically, master accumulator logic block M transmits the updated HF global count values from global accumulator memory $GC_0$ to PCIe switch 310, PCIe links 330 and PCIe switch 311 to slave accumulator logic block S1. In response, slave accumulator logic block S1 writes the updated HF global counter values to global accumulator memory $GC_1$.

During time intervals 17-24, slave accumulator logic block S1 transfers (writes) the updated HF counter values from global accumulator memory GC1 to global counter memories $GC_{14}$-$GC_{17}$ and $GC_{10}$-$GC_{13}$, respectively (via PCIe switch 311).

During time interval 17, master accumulator logic block M writes the updated HF global count values from global accumulator memory $GC_0$ to the global accumulator memory $GC_2$ of slave accumulator logic block S2. During time intervals 18-25, slave accumulator logic block S2 writes these updated HF global count values to global counter memories $GC_{24}$-$GC_{27}$ and $GC_{20}$-$GC_{23}$, respectively (via PCIe switch 312).

During time interval 18, master accumulator logic block M writes the updated HF global count values from global accumulator memory $GC_0$ to the global accumulator memory $GC_3$ of slave accumulator logic block S3. During time intervals 19-26, slave accumulator logic block S3 writes these updated HF global count values to global counter memories $GC_{34}$-$GC_{37}$ and $GC_{30}$-$GC_{33}$, respectively (via PCIe switch 313).

During time interval 19, master accumulator logic block M writes the updated HF global count values from global accumulator memory $GC_0$ the management processor memory 206 (via PCIe switch 310 and PCIe links 330).

During time intervals 20-27, master accumulator logic block M writes the updated HF global count values from global accumulator memory $GC_0$ to global counter memories $GC_{00}$-$GC_{07}$, respectively.

In this manner, the updated HF global count values are written to the global counter memories $GC_{00}$-$GC_{07}$, $GC_{10}$-$GC_{17}$, $GC_{20}$-$GC_{27}$, $GC_{30}$-$GC_{37}$ and the management processor memory 206 by the end of time interval 27. In addition, during time intervals 16-31, a new set of updated HF global counter values are also generated in the same manner described above in connection with FIG. 4A. Thus, during each 16 interval period (after the first 16 interval period), a new set of HF global counter values is updated, and a previously updated set of HF global counter values is retired to the global counter memories $GC_{00}$-$GC_{07}$, $GC_{10}$-$GC_{17}$, $GC_{20}$-$GC_{27}$ and $GC_{30}$-$GC_{37}$ and the management processor memory 206.

The synchronization of the low-frequency (LF) statistics counters will now be described. In general, the LF statistics counters are updated during the last four time intervals of each of the above-described 16 time interval periods.

Thus, during the time intervals 12-15 (FIG. 4A) and 28-31 (FIG. 4B), master accumulator logic block M reads associated sets of LF counter values from local counter memories $LC_{00}$-$LC_{07}$, respectively. Master accumulator logic block M accumulates these associated LF counter values, and stores these accumulated LF counter values in memory buffer LF0 within local accumulator memory $LC_0$.

During the time intervals 13-15 (FIG. 4A), 28-31 (FIG. 4B) and 44 (FIG. 4C), slave accumulator logic block S1 reads associated LF counter values from local counter memories $LC_{10}$-$LC_{17}$, respectively. Slave accumulator logic block S1 accumulates these LF counter values, and stores these accumulated LF counter values in local accumulator memory $LC_1$. During time interval 45 (FIG. 4C), slave accumulator logic block S1 writes these accumulated LF counter values to memory buffer LF1 within local accumulator memory $LC_0$. More specifically, slave accumulator logic block S1 transmits the accumulated LF counter values from local accumulator memory $LC_1$ to PCIe switch 311, PCIe links 330 and PCIe switch 310 to master accumulator logic block M. Master accumulator logic block M then writes the received accumulated LF counter values to memory buffer LF1 within local accumulator memory $LC_0$.

During the time intervals 12, 14-15 (FIG. 4A), 28-31 (FIG. 4B) and 44 (FIG. 4C), slave accumulator logic block S2 reads associated LF counter values from local counter memories $LC_{20}$-$LC_{27}$, respectively. Slave accumulator logic block S2 accumulates these LF counter values, and stores these accumulated LF counter values in local accumulator memory $LC_2$. During time interval 46 (FIG. 4C), slave accumulator logic block S2 writes these accumulated LF counter values to memory buffer LF2 within local accumulator memory $LC_0$ (via PCIe switch 312, PCIe links 330, PCIe switch 310 and master accumulator logic block M).

During time intervals 12-13, 15 (FIG. 4A), 28-31 (FIG. 4B) and 44 (FIG. 4C), slave accumulator logic block S3 reads associated LF counter values from local counter memories $LC_{30}$-$LC_{37}$, respectively. Slave accumulator logic block S3 accumulates these LF counter values, and stores these accumulated LF counter values in local accumulator memory $LC_3$. During time interval 47 (FIG. 4C) slave accumulator logic block S3 writes these accumulated LF counter values to memory buffer LF3 within local accumulator memory $LC_0$ (via PCIe switch 313, PCIe links 330, PCIe switch 310 and master accumulator logic block M).

During time intervals 60-63 (FIG. 4D), master accumulator logic block M accumulates (ACC) the accumulated LF counter values stored in the memory buffers LF0-LF3 of local accumulator memory $LC_0$, thereby generating a first set (1 KB) of LF global count values. During the accumulation process, master accumulator logic block M stores the resulting set of LF global count values in global accumulator memory $GC_0$. Note that the above-described 64 time interval process is repeated (e.g., during time intervals 64-127 of FIGS. 5A-5E), such that a new set of LF global count values is calculated and stored in global accumulator memory $GC_0$ by the end of each successive 64 time interval period.

After a set of LF global count values are calculated, these updated LF global count values are written to the global counter memories $GC_{00}$-$GC_{07}$, $GC_{10}$-$GC_{17}$, $GC_{20}$-$GC_{27}$, $GC_{30}$-$GC_{37}$ and the management processor memory 206, in the manner described below in connection with FIGS. 5A-5D.

As illustrated in FIG. 5A, master accumulator logic block M writes the updated LF global count values from global accumulator memory $GC_0$ to the global accumulator memory $GC_1$ during time interval 76 (via PCIe switch 310, PCIe links 330, PCIe switch 311 and slave accumulator logic block S1). Slave accumulator logic block S1 then writes the updated LF counter values from global accumulator memory $GC_1$ to global counter memory blocks $GC_{14}$, $GC_{15}$, $GC_{16}$, $GC_{17}$, $GC_{10}$, $GC_{11}$, $GC_{12}$ and $GC_{13}$ during time intervals 77, 78, 79, 92, 93, 94, 95 and 108, respectively (via PCIe switch 311).

Master accumulator logic block M writes the updated LF global count values from global accumulator memory $GC_0$ to the global accumulator memory $GC_2$ during time interval 77 (FIG. 5A). Slave accumulator logic block S2 then writes the updated LF counter values from global accumulator memory $GC_2$ to global counter memory blocks $GC_{24}$, $GC_{25}$, $GC_{26}$, $GC_{27}$, $GC_{20}$, $GC_{21}$, $GC_{22}$ and $GC_{23}$ during time intervals 78, 79, 92, 93, 94, 95, 108 and 109, respectively (via PCIe switch 312).

Master accumulator logic block M writes the updated LF global count values from global accumulator memory $GC_0$ to the global accumulator memory $GC_3$ during time interval 78 (FIG. 5A). Slave accumulator logic block S3 then writes the updated LF counter values from global accumulator memory $GC_3$ to global counter memory blocks $GC_{34}$, $GC_{35}$, $GC_{36}$, $GC_{37}$, $GC_{30}$, $GC_{31}$, $GC_{32}$ and $GC_{33}$ during time intervals 79, 92, 93, 94, 95, 108, 109 and 110, respectively (via PCIe switch 313).

During time interval 79, master accumulator logic block M writes the updated LF global count values from global accumulator memory $GC_0$ the management processor memory 206 (via PCIe switch 310 and PCIe links 330).

During time intervals 92-95 (FIG. 5B) and 108-111 (FIG. 5C), master accumulator logic block M writes the updated LF global count values from global accumulator memory $GC_0$ to global counter memories $GC_{00}$-$GC_{07}$, respectively.

In this manner, the updated LF global count values are written to the global counter memories $GC_{00}$-$GC_{07}$, $GC_{10}$-$GC_{17}$, $GC_{20}$-$GC_{27}$, $GC_{30}$-$GC_{37}$ and the management processor memory 206 by the end of time interval 110. In addition, during time intervals 64-127, a new set of updated LF global counter values is also generated in the same manner described above in connection with FIGS. 4A-4D. Thus, during each 64 interval period (after the first 64 interval period), a new set of LF global counter values is updated, and a previously updated set of LF global counter values is retired to the global counter memories $GC_{00}$-$GC_{07}$, $GC_{10}$-$GC_{17}$, $GC_{20}$-$GC_{27}$, $GC_{30}$-$GC_{37}$ and the management processor memory 206.

In accordance with one embodiment of the present invention, the maximum transfer speed on PCIe links 330 (and through PCIe switching circuits 310-313) is 12 Gbits/s (effective throughput for x8 lane). Thus, the maximum update speed can be calculated as follows. From the perspective of the master accumulator logic block M, 256 KB of counter values must be read from each of the eight local counter memories $LC_{00}$-$LC_{07}$, for a total of about 3 MB. Master accumulator logic block M must also read 256 KB of accumulated counter values from each of the three local accumulator memories LC1, LC2 and LC, for a total of 768 KB. The fastest read time for an update operation is therefore 3.768 KB/(12 Gbit/s), or 2.512 ms.

Also from the perspective of the master accumulator logic block M, 256 KB of updated counter values must be written to each of the eight local counter memories $LC_{00}$-$LC_{07}$, for a total of about 3 MB. Master accumulator logic block M must write read 256 KB of accumulated counter values into the management processor memory 206, and into each of the three local accumulator memories LC1, LC2 and LC3, for a total of 1 MB. The fastest write time for an update operation is therefore 4 MB/(12 Gbit/s), or 2.667 ms.

Because read and write operations can be performed simultaneously in the manner described above in FIGS. 4A-4D and 5A-5D, the maximum theoretical update rate of network system 200 is about 2.667 ms. Note that if the management processor 205 were to perform the updating in accordance with conventional techniques, the update process would typically take 200-300 ms. Thus, the present invention represents an improvement of about 100×.

In accordance with different variations of the present invention, the interval at which the global counter view is updated may be increased, thereby reducing the load on the PCIe subsystem. Alternately, the number of counters updated in the global counter view may be reduced, thereby providing a faster update rate and/or reducing the load on the PCIe subsystem.

Although the present invention has been described in connection with various embodiments, it is understood that variations of these embodiments would be obvious to one of ordinary skill in the art. Thus, the present invention is limited only by the following claims.

We claim:

1. A method comprising:
aggregating local counter values associated with a first set of processors, thereby creating a first set of aggregated local counter values;
aggregating local counter values associated with a second set of processors, thereby creating a second set of aggregated local counter values; and then
aggregating the first and second sets of aggregated local counter values, thereby creating a global set of aggregated counter values; and
performing a load balancing with the first and second sets of processors in response to the global set of aggregated counter values.

2. The method of claim 1, further comprising displaying the global set of aggregated counter values with a management processor, wherein the management processor does not perform any of the aggregating steps.

3. The method of claim 1, wherein the first set of processors are located on a first blade and the second set of processors are located on a second blade, the method further comprising:
aggregating the local counter values associated with the first set of processors on the first blade; and
aggregating the local counter values associated with the second set of processors on the second blade.

4. The method of claim 3, further comprising
transferring the second set of aggregated local counter values from the second blade to the first blade; and
aggregating the first and second sets of aggregated local counter values on the first blade.

5. The method of claim 4, further comprising:
transferring the global set of aggregated counter values from the first blade to the second blade; and then
distributing the global set of aggregated counter values to the second set of processors.

6. The method of claim 4, further comprising distributing the global set of aggregated counter values to the first set of processors on the first blade.

7. The method of claim 4, further comprising:
transferring the global set of aggregated counter values to a management card separate from the first and second blades; and then
using the management card to display the global set of aggregated counter values.

8. A blade for a network device comprising:
a plurality of processors;
a plurality of local counter memories, each storing local counter values associated with a corresponding one of the processors;
an accumulator circuit that receives and aggregates the local counter values from each of the local counter memories; and
a control line coupling the accumulator circuit to an external connector of the blade, wherein the control line carries a control signal that synchronizes the aggregation of the local counter values within the network device.

9. The blade of claim 8, further comprising a plurality of global counter memories, each associated with a corresponding one of the processors, and each storing a set of aggregated local counter values.

10. The blade of claim 8, further comprising a local accumulator memory coupled to the accumulator circuit, wherein the local accumulator memory stores aggregated local counter values provided by the accumulator circuit.

11. The blade of claim 10, further comprising means for routing the aggregated local counter values off of the blade.

12. The blade of claim 8, further comprising a switching circuit coupling the processors to the accumulator circuit and to one or more links coupled to external connectors of the blade.

13. A network device comprising:
a plurality of blades, each blade including:
a plurality of processors that route requests received by the network device, wherein each of the processors maintains a set of local counter values; and
an accumulator circuit that periodically receives and aggregates the sets of local counter values maintained by the processors of the blade.

14. The network device of claim 13, further comprising a control line coupling the accumulator circuits of the plurality of blades, wherein the control line carries a control signal that synchronizes the accumulator circuits.

15. The network device of claim 13, wherein each of the blades further comprises a local accumulator memory that stores aggregated sets of local counter values created by the accumulator circuit of the blade.

16. The network device of claim 15, further comprising means for transferring the aggregated sets of local counter values to a single one of the blades.

17. A method comprising:
aggregating a first set of local counter values associated with a first set of processors at a first frequency, thereby creating a first set of aggregated local counter values;
aggregating a second set of local counter values associated with the first set of processors at a second frequency, thereby creating a second set of aggregated local counter values, wherein the first frequency is greater than the second frequency;
aggregating a third set of local counter values associated with a second set of processors at the first frequency, thereby creating a third set of aggregated local counter values;
aggregating a fourth set of local counter values associated with the second set of processors at the second frequency, thereby creating a fourth set of aggregated local counter values;
aggregating the first and third sets of aggregated local counter values, thereby creating a first global set of aggregated counter values; and
performing a load balancing with the first and second sets of processors in response to the first global set of aggregated counter values.

18. The method of claim 17, further comprising, aggregating the second and fourth sets of aggregated local counter values, thereby creating a second global set of aggregated counter values.

* * * * *